United States Patent
Wilson et al.

(10) Patent No.: US 8,574,773 B2
(45) Date of Patent: Nov. 5, 2013

(54) BATTERY ELECTROLYTE SOLUTIONS CONTAINING AROMATIC PHOSPHORUS COMPOUNDS

(75) Inventors: David R. Wilson, Midland, MI (US); Ravi B. Shankar, Midland, MI (US); Houxiang Tang, Midland, MI (US); Andrew J. Pasztor, Jr., Midland, MI (US); Peter M. Margl, Midland, MI (US); William J. Kruper, Jr., Sanford, MI (US); Mark D. Newsham, Sanford, MI (US); Jing Jin, Midland, MI (US); Matthew M. Yonkey, Mount Pleasant, MI (US); Deidre A. Strand, Midland, MI (US); Thomas D. Gregory, Midland, MI (US); Jamie L. Cohen, Midland, MI (US); Jeremy R. Stajdl, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 328 days.

(21) Appl. No.: 13/132,374

(22) PCT Filed: Nov. 16, 2009

(86) PCT No.: PCT/US2009/064622
§ 371 (c)(1),
(2), (4) Date: Jun. 2, 2011

(87) PCT Pub. No.: WO2010/074838
PCT Pub. Date: Jul. 1, 2010

(65) Prior Publication Data
US 2011/0250503 A1 Oct. 13, 2011

Related U.S. Application Data

(60) Provisional application No. 61/140,579, filed on Dec. 23, 2008.

(51) Int. Cl.
*H01M 10/0567* (2010.01)
*H01M 10/052* (2010.01)

(52) U.S. Cl.
USPC ........... 429/307; 429/207; 429/342; 429/388; 429/341; 429/340; 429/339; 429/200

(58) Field of Classification Search
None
See application file for complete search history.

(56) References Cited

U.S. PATENT DOCUMENTS 5,830,600 A 11/1998 Narang
(Continued)

FOREIGN PATENT DOCUMENTS

EP 917224 A 5/1999
JP 2002-280061 A 9/2002

OTHER PUBLICATIONS

Hyung et al., J. Power Sources 119-121 (2003) 383-387.
Zhang et al., J. Power Sources 162 (2006) 1379-1394.

*Primary Examiner* — Patrick Ryan
*Assistant Examiner* — Christopher Domone
(74) *Attorney, Agent, or Firm* — Gary C Cohn PLLC

(57) ABSTRACT

A battery electrolyte solution contains from 0.01 to 80% by weight of an aromatic phosphorus compound. The aromatic phosphorus compound provides increased thermal stability for the electrolyte, helping to reduce thermal degradation, thermal runaway reactions and the possibility of burning. The aromatic phosphorus compound has little adverse impact on the electrical properties of the battery, and in some cases actually improves battery performance.

11 Claims, 2 Drawing Sheets

(56) References Cited

U.S. PATENT DOCUMENTS

| | | |
|---|---|---|
| 6,096,447 A | 8/2000 | Gan |
| 6,210,840 B1 | 4/2001 | Usami |
| 6,469,471 B1 | 10/2002 | Anbuky |
| 6,746,794 B2 | 6/2004 | Mandal |
| 6,924,061 B1 | 8/2005 | Jow |
| 7,169,511 B2 | 1/2007 | Noda |
| 2007/0087270 A1 | 4/2007 | Noda |
| 2007/0218370 A1 | 9/2007 | Deguchi |
| 2007/0224515 A1 | 9/2007 | Xu |
| 2008/0153950 A1 | 6/2008 | Shankar |

BATTERY ELECTROLYTE SOLUTIONS CONTAINING AROMATIC PHOSPHORUS COMPOUNDS

This application claims priority from U.S. Provisional Patent Application No. 61/140,579, filed 23 Dec. 2008.

The present invention relates to nonaqueous electrolyte solutions which contain aromatic phosphorus additives.

Lithium batteries are widely used as primary and secondary batteries for vehicles and many types of electronic equipment. These batteries tend to have high energy and power densities and for that reason are favored in many applications. The electrolyte solution in a lithium battery is by necessity a nonaqueous type. The nonaqueous electrolyte solution is generally a high dielectric content solution of a lithium salt in an organic solvent or a mixture of organic solvents. Various linear and cyclic carbonates are commonly used, but certain esters, alkyl ethers, nitriles, sulfones, sulfolanes, sultones and siloxanes may also serve as the solvent. In many cases, the solvent may contain two or more of these materials. Polymer gel electrolyte solutions are also known.

Because they contain high concentrations of organic materials, these electrolyte solutions are sensitive to high temperatures. They may decompose, engage in runaway exothermic reactions or even burn if exposed to the wrong conditions. Lithium batteries have been known to catch fire due to overcharge, overdischarge, short circuit conditions, and mechanical or thermal abuses. Other problems can occur short of burning, including a significant loss of battery life. Therefore, additives have been incorporated into the electrolyte solutions of lithium batteries to help stabilize the electrolyte.

A number of phosphorus compounds have been suggested as flame retardants or "thermal runaway inhibitors" for battery electrolyte solutions. These include various phosphine oxide ($O:PR_3$), phosphinite ($P(OR)R_2$), phosphonite ($P(OR)_2R$), phosphite ($P(OR)_3$), phosphinate ($O:P(OR)R_2$), phosphonate ($O:P(OR)_2R$), phosphate ($O:P(OR)_3$) and phosphazene ($-N=PR_2-$)$_n$ compounds.

These phosphorus compounds have not been altogether satisfactory. Some must be added in very large amounts to be effective. Others interact with the nonaqueous solvent, the lithium salt or other additives in the electrolyte solution, or with the anode or cathode material. Still others have an adverse impact on the performance of the battery. It would be desirable to provide an additive for a nonaqueous battery electrolyte solution, which provides good stabilization at reasonable levels, does not adversely interact with other components in the electrolyte solution or with the anode or cathode, and which has little or no adverse impact on battery performance.

This invention is in one aspect a battery electrolyte solution comprising at least one lithium salt and a nonaqueous solvent in which the lithium salt is soluble, wherein from 0.01 to 80% of the weight of the battery electrolyte solution is at least one aromatic phosphorus compound represented by structure I:

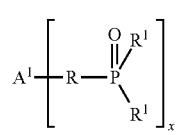

(I)

wherein $A^1$ is a radical that contains one or more aromatic rings; each R is independently an alkylene diradical which may contain 1, 2 or 3 carbon atoms and which is bonded directly to a carbon atom of an aromatic ring of the $A^1$ group; each $R^1$ is independently hydrogen, halogen, OH, a hydrocarbyl group having up to 12 carbon atoms or an alkoxyl group having up to 12 carbon atoms; or two $R^1$ groups attached to the same phosphorus atom may together form a ring structure that includes the phosphorus atom; and x is an integer of at least 2.

This invention is also an electrical battery comprising an anode, a cathode, a separator disposed between the anode and cathode, and a nonaqueous battery electrolyte solution in contact with the anode and cathode, wherein the battery electrolyte solution comprises at least one lithium salt, a nonaqueous solvent in which the lithium salt is soluble, and wherein from about 0.01 to 80% by weight of the weight of the battery electrolyte solution is at least one aromatic phosphorus compound represented by structure I.

The aromatic phosphorus compound as described herein provides good thermal stabilization to the battery electrolyte solution. The battery electrolyte solution tends to be resistant to thermal degradation, is less likely to engage in thermal runaway reactions and is resistant to combustion. Surprisingly, these aromatic phosphorus compounds sometimes actually increase battery capacity utilization, discharge rate capability and/or cycling stability of the battery.

In certain preferred embodiments, the battery electrolyte solution further contains (a) one or more phosphorus-sulfur compounds as described further below, (b) one or more carbonate compounds containing at least one aliphatic carbon-carbon double bond, (c) at least one sultone compound, or (d) a mixture of two or more of any of the foregoing. Batteries containing such preferred electrolyte solutions tend to have especially good cycling stability, and the thermal stability of the electrolyte solution tends to remain very good in these cases, even after repeated cycling.

Figure 1:
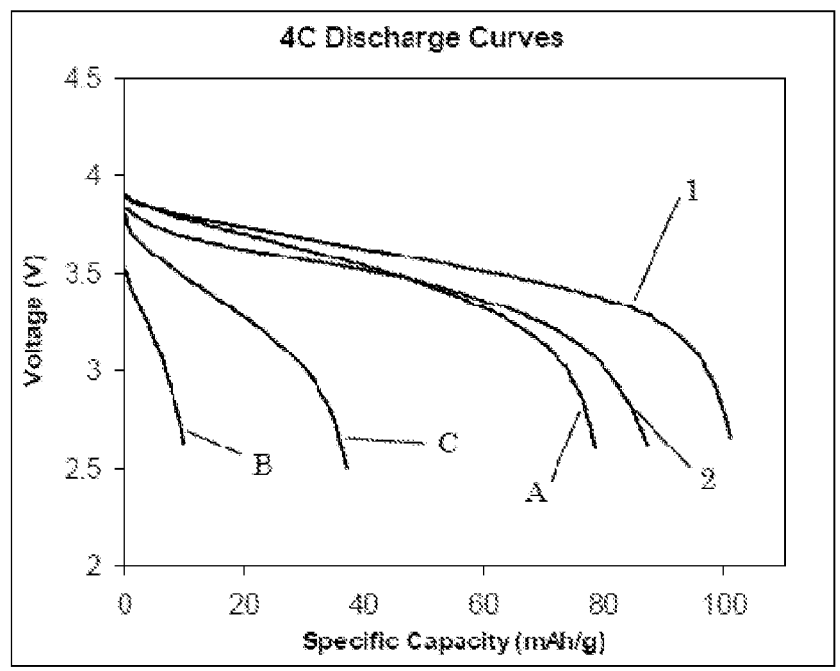
FIG. 1 is a graph of 4C discharge curves for two batteries in accordance with the invention and three comparative batteries.

Each $R^1$ group in structure I can vary independently and is preferably an alkoxyl group having up to 8 carbon atoms, more preferably up to 4 carbon atoms and even more preferably from 1 to 3 carbon atoms. An alkoxyl $R^1$ group may be linear or branched, and may contain substituent groups such as halogen (especially fluorine, chlorine or bromine) or alkoxyl. Two alkoxyl $R^1$ groups attached to a phosphorus atom may together form a ring structure that includes the phosphorus atom. Such a ring structure can be represented by structure II:

(II)

wherein $R^2$ is an alkylene diradical that may be substituted with ether linkages, halogen or alkoxyl groups. Especially preferred $R^1$ groups in structure I are methoxyl, ethoxyl, isopropoxyl and n-propoxyl.

Each R group in structure I is preferably methylene (—CH$_2$—), ethylene (—CH$_2$—CH$_2$—) or isopropylene (—CH$_2$—CH(CH$_3$)—), with methylene being most preferred. Each R group in structure I is bonded directly to a carbon atom of an aromatic ring of the A$^1$ radical.

The A$^1$ radical of structure I contains at least one aromatic ring. It may contain 2 or more aromatic rings. If multiple aromatic rings are present, the rings may be joined as a fused ring structure (as in naphthalene), linked by a covalent bond (such as in a biphenyl compound), linked through one or more aliphatic or cycloaliphatic groups, or linked through a heteroatom-containing group (such as an ether, ester, amino, amido, carbonate, or —SO$_2$— linkage).

An aromatic ring contained in the A$^1$ radical may contain substitution in addition to the —R—P(O)—(R$^1$)$_2$ groups and any linkages to other rings. Examples of such substituent groups include halogen, hydroxyl, linear or branched-chain alkyl (preferably containing up to 4 carbon atoms), alkoxyl (preferably containing up to 4 carbon atoms) or linear or branched-chain alkenyl (preferably containing up to 4 carbon atoms).

A preferred aromatic phosphorus compound has the structure III:

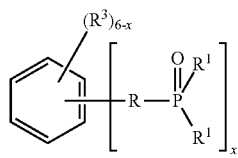

(III)

wherein each R$^3$ is independently hydrogen, hydroxyl, halogen, C$_{1-3}$ alkyl, alkoxyl containing from 1 to 3 carbon atoms or C$_{2-3}$ alkylene, and R, R$^1$ and x are as defined with respect to structure I. The R$^3$ groups most preferably are hydrogen or C$_{1-3}$ alkyl.

The value of x is preferably from 2 to 4 and more preferably from 2 to 3.

Among the useful classes of aromatic phosphonate compounds are those having structures IV or V:

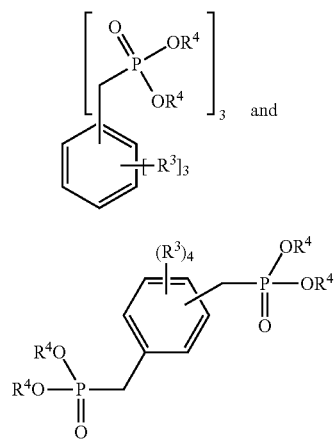

(IV) and (V)

wherein in each case each R$^4$ is independently alkyl having from 1 to 8, preferably 1 to 4 and more preferably from 1 to 3 carbon atoms and R$^3$ is as defined with respect to structure III. Preferably, each R$^4$ in structures IV and V is independently methyl, ethyl or isopropyl and each R$^3$ is preferably hydrogen or C$_{1-3}$ alkyl. In structure IV, the phosphonate groups may be in the 1,2,3-, 1,2,4- or 1,3,5-positions on the benzene ring, taking one of them as the 1 position. In structure V, the phosphonate groups may be in the ortho, meta or para positions with respect to each other on the benzene ring.

Specific aromatic phosphorus compounds that are useful herein include:

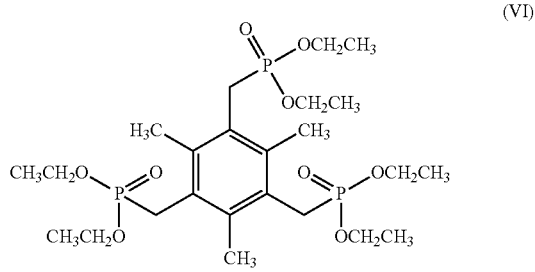

(VI)

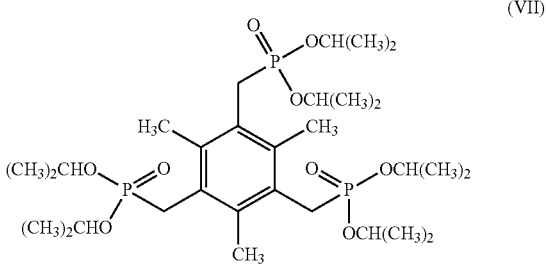

(VII)

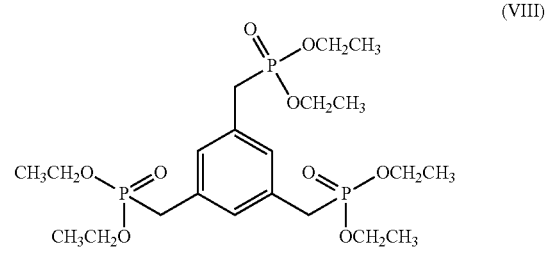

(VIII)

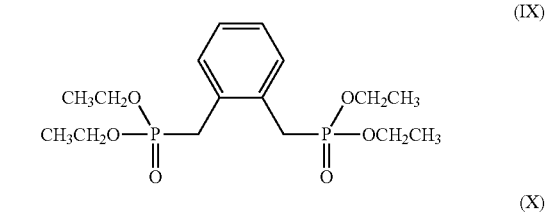

(IX)

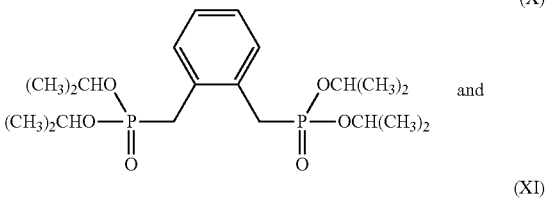

(X) and

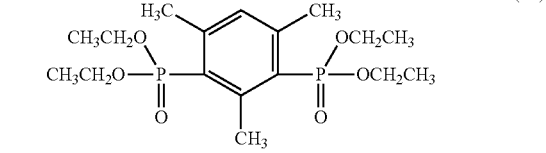

(XI)

Aromatic phosphorus compounds of structures VI and X are especially preferred.

Mixtures of two or more of the aromatic phosphorus compounds can be used. A mixture of particular interest is a mixture of from 10 to 95% by weight of an aromatic phosphorus compound of structure III, in which the value of x is at least 3, preferably 3 or 4, and from 5 to 90% by weight of a second aromatic phosphorus compound of structure III, in which the value of x is 2. The weight ratios of the two aromatic phosphorus compounds is preferably from 30:70 to 70:30 or from 40:60 to 60:40 by weight. The presence of such a mixture has been found to make the battery electrolyte more storage stable, compared to when all the structure III compounds present are ones in which x is 3 or more is present.

The aromatic phosphorus compound(s) may constitute from about 0.01 to as much as 80% of the total weight of the battery electrolyte solution. However, an advantage of the invention is that the aromatic phosphorus compound is generally effective at low levels of addition. Therefore, the aromatic phosphorus compound preferably does not constitute more than 15%, more preferably 10% of the total weight of the battery electrolyte solution. An especially preferred amount is up to 5% of the total weight of the battery electrolyte solution. A preferred lower amount is at least 0.1% of the total electrolyte solution weight.

The other main components of the battery electrolyte solution are a lithium salt and a nonaqueous solvent for the lithium salt.

The lithium salt may be any that is suitable for battery use, including inorganic lithium salts such as $LiAsF_6$, $LiPF_6$, $LiB(C_2O_4)_2$, $LiBF_4$, $LiBF_2C_2O_4$, $LiClO_4$, $LiBrO_4$ and $LiIO_4$ and organic lithium salts such as $LiB(C_6H_5)_4$, $LiCH_3SO_3$, $LiN(SO_2C_2F_5)_2$ and $LiCF_3SO_3$. $LiPF_6$, $LiClO_4$, $LiBF_4$, $LiAsF_6$, $LiCF_3SO_3$ and $LiN(SO_2CF_3)_2$ are preferred types, and $LiPF_6$ is an especially preferred lithium salt.

The lithium salt is suitably present in a concentration of at least 0.5 moles/liter of electrolyte solution, preferably at least 0.75 moles/liter, up to 3 moles/liter and more preferably up to 1.5 moles/liter.

The nonaqueous solvent may include, for example, one or more linear alkyl carbonates, cyclic carbonates, cyclic esters, linear esters, cyclic ethers, alkyl ethers, nitriles, sulfones, sulfolanes, siloxanes and sultones. Mixtures of any two or more of the foregoing types can be used. Cyclic esters, linear alkyl carbonates, and cyclic carbonates are preferred types of nonaqueous solvents.

Suitable linear alkyl carbonates include dimethyl carbonate, diethyl carbonate, methyl ethyl carbonate and the like. Cyclic carbonates that are suitable include ethylene carbonate, propylene carbonate, butylene carbonate and the like. Suitable cyclic esters include, for example, γ-butyrolactone and γ-valerolactone. Cyclic ethers include tetrahydrofuran, 2-methyltetrahydrofuran, tetrahydropyran and the like. Alkyl ethers include dimethoxyethane, diethoxyethane and the like. Nitriles include mononitriles, such as acetonitrile and propionitrile, dinitriles such as glutaronitrile, and their derivatives. Sulfones include symmetric sulfones such as dimethyl sulfone, diethyl sulfone and the like, asymmetric sulfones such as ethyl methyl sulfone, propyl methyl sulfone and the like, and their derivatives. Sulfolanes include tetramethylene sulfolane and the like.

Some preferred solvent mixtures include mixtures of a cyclic carbonate with a linear alkyl carbonate at a weight ratio of from 15:85 to 40:60; a cyclic carbonate/cyclic ester mixture at a weight ratio of from 20:80 to 60:40: a cyclic carbonate/cyclic ester/linear alkyl carbonate mixture at weight ratios of 20-48:50-78:2-20; cyclic ester/linear alkyl carbonate mixtures at a weight ratio of from 70:30 to 98:2.

Solvent mixtures of particular interest are mixtures of ethylene carbonate and propylene carbonate at a weight ratio of from 15:85 to 40:60; mixtures of ethylene carbonate and dimethyl carbonate at a weight ratio of from 15:85 to 40:60; mixtures of ethylene carbonate, propylene carbonate and dimethyl carbonate at a weight ratio of 20-48:50-78:2-20, and mixtures of propylene carbonate and dimethyl carbonate at a weight ratio of from 15:85 to 40:60.

Various other additives may be present in the battery electrolyte solution, in addition to the components already mentioned. These may include, for example, additives which promote the formation of a solid electrolyte interface at the surface of a graphite electrode; various cathode protection agents; lithium salt stabilizers; lithium deposition improving agents; ionic solvation enhancers; corrosion inhibitors; wetting agents; flame retardants; and viscosity reducing agents. Many additives of these types are described by Zhang in "A review on electrolyte additives for lithium-ion batteries", *J. Power Sources* 162 (2006) 1379-1394.

Agents which promote solid electrolyte interface (SEI) formation include various polymerizable ethylenically unsaturated compounds, various sulfur compounds, as well as other materials. Suitable cathode protection agents include materials such as N,N-diethylaminotrimethylsilane and $LiB(C_2O_4)_2$. Lithium salt stabilizers include LiF, tris(2,2,2-trifluoroethyl)phosphite, 1-methyl-2-pyrrolidinone, fluorinated carbamate and hexamethylphosphoramide. Examples of lithium deposition improving agents include sulfur dioxide, polysulfides, carbon dioxide, surfactants such as tetraalkylammonium chlorides, lithium and tetraethylammonium salts of perfluorooctanesulfonate, various perfluoropolyethers and the like. Crown ethers can be suitable ionic solvation enhancers, as are various borate, boron and borole compounds. $LiB(C_2O_4)_2$ and $LiF_2C_2O_4$ are examples of aluminum corrosion inhibitors. Cyclohexane, trialkyl phosphates and certain carboxylic acid esters are useful as wetting agents and viscosity reducers. Some materials, such as $LiB(C_2O_4)_2$, may perform multiple functions in the electrolyte solution.

The various other additives may together constitute up to 20%, preferably up to 10% of the total weight of the battery electrolyte solution.

The battery electrolyte that contains a structure III compound may contain an aromatic monophosphate compound corresponding to structure XII:

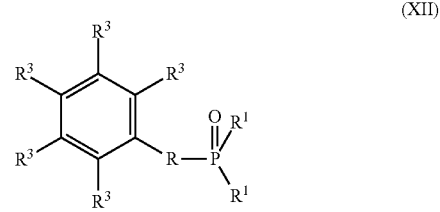

wherein each $R^3$, R and $R^1$ are as defined with respect to structures I and III. The presence of a structure XII compound is preferred when x in the structure III compound is three or more. The weight ratio of the structure III compound to the structure XII compound may be from 10:90 to 95:5, and is preferably from 30:70 to 70:30 or from 40:60 to 60:40. The presence of the structure XII compound, in conjunction with a structure III compound in which x is 3 or more, has been found to make the battery electrolyte more storage stable, compared to when only the structure III compound (in which x is 3 or more) is present. Examples of suitable structure XII compounds are:

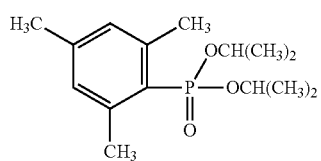 (XIII)

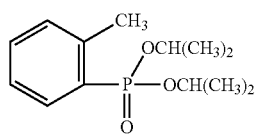 (XIV)

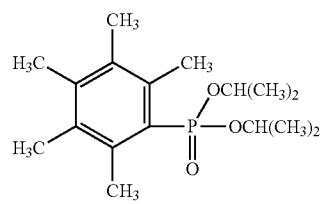 (XV)

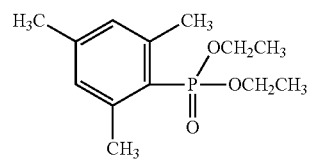 (XVI)

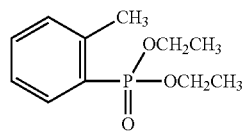 (XVII)

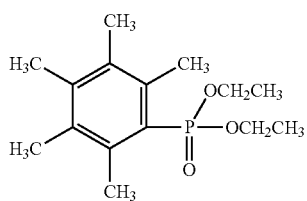 (XVIII)

A preferred battery electrolyte contains (a) at least one phosphorus-sulfur compound, (b) at least one carbonate that contains aliphatic carbon-carbon unsaturation, (c) at least one sultone compound or (d) a mixture of two or more of any of the foregoing. The presence of one or more of these compounds has been found to significantly improve the cycling stability of batteries containing these electrolyte solutions, as well as the thermal stability of the solutions after cycling. These compounds, individually or in the aggregate, may constitute from 0.001 to 20 percent of the total weight of the battery electrolyte solution. A preferred lower limit is at least 0.01 weight percent and a preferred upper amount is 10 weight percent, again based on the total weight of the battery electrolyte solution.

Suitable phosphorus-sulfur compounds are described in WO 08/88487, the disclosure of which is incorporated herein by reference. Such phosphorus-sulfur compounds are represented by the structure XIX:

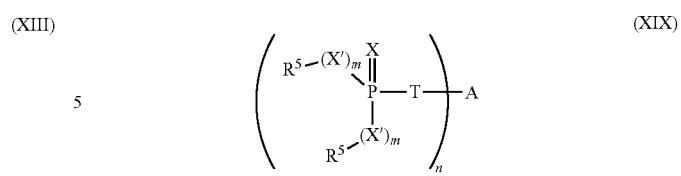 (XIX)

wherein X is oxygen or sulfur, T is a covalent bond, oxygen or sulfur, provided that at least one of X and T is sulfur, each X' is independently oxygen or sulfur, each m is independently zero or 1 when X' is oxygen and zero, 1 or 2 when X' is sulfur, n is at least 1 and preferably at least 2, each $R^5$ is independently an unsubstituted or inertly substituted hydrocarbyl group or the $R^5$ groups together form an unsubstituted or inertly substituted divalent organic group and A is an organic linking group.

Certain useful types of suitable phosphorus-sulfur additives can be represented by structures XX, XXI and XXII:

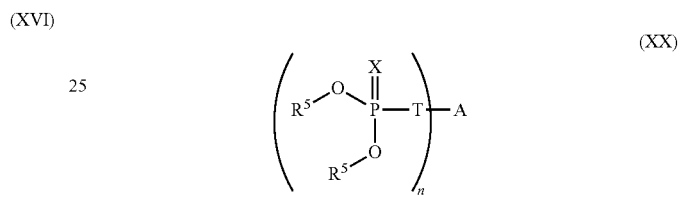 (XX)

 (XXI)

 (XXII)

wherein R, X, T, A, and n are as described with respect to structure XIX, and at least one of X and T is sulfur. In structures XIX, XX, XXI and XXII, T is preferably oxygen or sulfur, most preferably sulfur. X is preferably sulfur and n is preferably at least 2. In structures XIX, XX, XXI, or XXII, the $R^5$ groups may be, for example, unsubstituted or inertly substituted aliphatic, cycloaliphatic or aromatic groups. An "inert" substituent is one that does not significantly interfere with the SEI-forming properties of the additive. The inert substituent may be, for example, an oxygen-containing group such as an ether, ester, carbonyl or oxirane group, and the like. An inert substituent may be a nitrogen-containing group such as a primary, secondary or tertiary amine group, an imine group, an amide group or a nitro group. The inert substituent may contain other hetero atoms such as sulfur, phosphorus and the like.

A hydrocarbyl group, for purposes of this invention, is a group that contains only hydrogen and carbon atoms. A hydrocarbyl group may be aliphatic, alicyclic, aromatic or some combination of two or more of those types.

The $R^5$ groups in structures XIX, XX, XXI, or XXII are preferably unsubstituted or inertly substituted lower alkyl, such as methyl, ethyl, n-propyl, isopropyl, n-butyl, isobutyl, sec-butyl, t-butyl and the like. In other preferred embodiments, the two $R^5$ groups together form a divalent organic radical that completes a ring structure with the —$(X')_m$—P—$(X')_m$—, —O—P—O—, —S—P—O— or —S—P—S— linkages, respectively, as shown, for example, in structure XXIII below.

An especially preferred phosphorus-sulfur additive is a compound represented by structure XXIII:

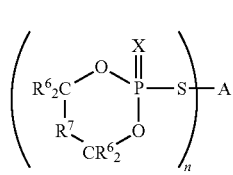
(XXIII)

wherein X, n, and A are as described with respect to structure XIX (X preferably being sulfur), each $R^6$ is independently hydrogen, alkyl or inertly substituted alkyl, and $R^7$ is a covalent bond or a divalent linking group. In structure XXIII, the $R^6$ groups are preferably hydrogen or lower alkyl and more preferably hydrogen. $R^7$ is preferably a straight-chain or branched hydrocarbyl group, —O—, or a covalent bond. More preferred $R^7$ groups are hydrocarbyl groups that are gem-disubstituted on the carbon atom or carbon atoms that are bonded directly to the $R^6_2C$ groups. The $R^7$ group is most preferably dialkyl-substituted methylene, as is the case when the $R^7$ group is (dim ethyl)methylene.

An especially preferred type of phosphorus-sulfur additive is represented by the structure XXIV:

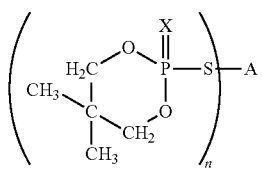
(XXIV)

where X, n and A are as described with respect to structure XIX. X is preferably sulfur.

The A group in structures XIX-XXIV is an organic linking group. The organic linking group may have a wide variety of possible structures. An organic linking group is covalently bonded to the -T- linkage (in structures XIX-XXII) or the —S— atom (in structures XXIII and XXIV). The -T- or —S— linkage may be bonded to a carbon atom or a heteroatom on the organic linking group A, but is preferably bonded to a carbon atom. That carbon atom is preferably a primary or secondary carbon atom (i.e., is bonded to 1 or 2 other carbon atoms), but is less preferably a tertiary carbon atom (i.e., one bonded to three other carbon atoms).

One type of organic linking group A is an unsubstituted or inertly substituted hydrocarbyl group. The organic linking group A may contain any number of carbon atoms, although it is preferred that the molecular weight per phosphorus atom does not exceed about 1000 daltons, more preferably does not exceed about 750 daltons, and especially is below 500 daltons. The phosphorus-sulfur additive may contain from 5 to 50% or more sulfur by weight. The organic linking group A may be aliphatic (linear or branched), alicyclic, aromatic, or some combination of these. The valence of the organic linking group A is equal to n.

One preferred type of linking group A for structures XIX-XXIV is bonded to the -T- or —S— linkage (as the case may be) through a benzylic carbon atom. Specific examples of phosphorus-sulfur additives containing this type of A group are shown in structures XXV-XXXIV, as follow:

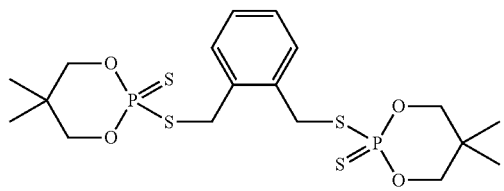
(XXV)

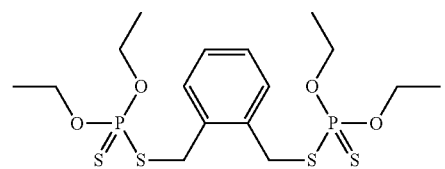
(XXVI)

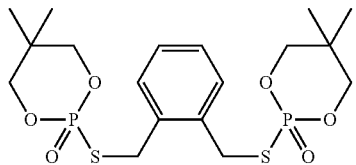
(XXVII)

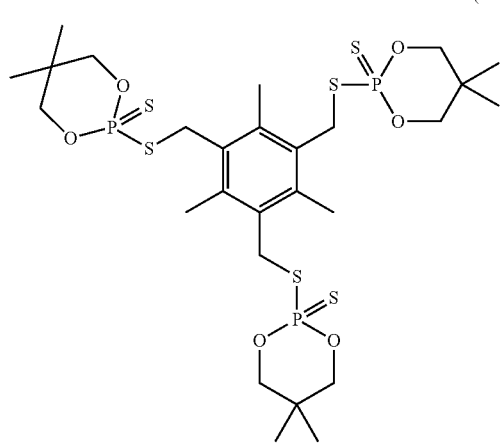
(XXVIII)

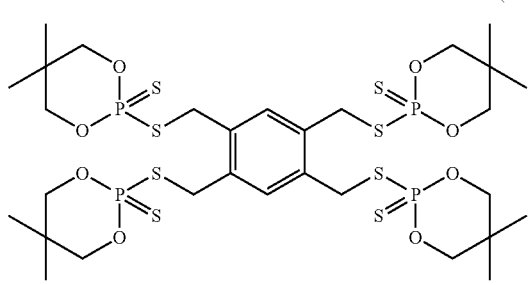
(XXIX)

(XXX)

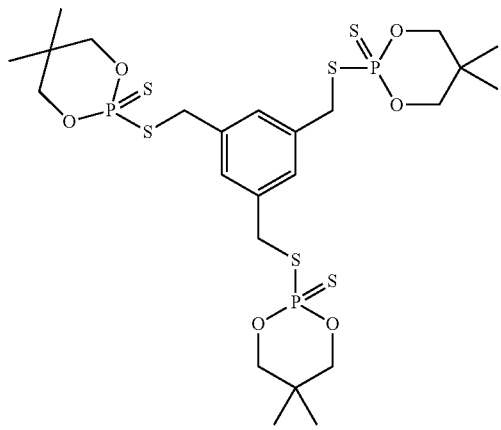

(XXXI)

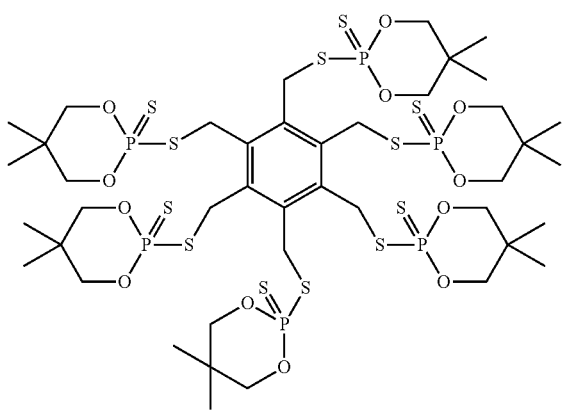

(XXXII)

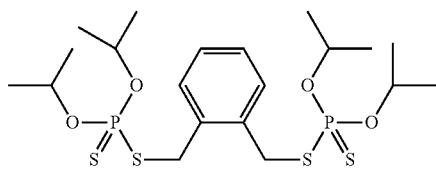

(XXXIII)

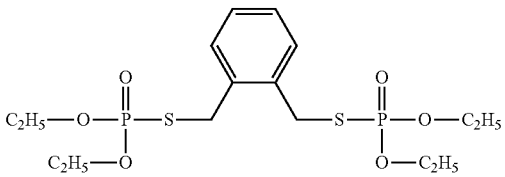

(XXXIV)

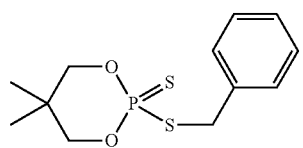

It is also possible for the phosphorus-sulfur groups to be bonded directly to an aromatic ring of an A group.

Suitable carbonate compounds that have aliphatic carbon-carbon unsaturation include vinylidine carbonate, vinyl ethyl carbonate, allyl ethyl carbonate and the like.

Sultone compounds are cyclic sulfonate esters of hydroxyl sulfonic acids. They can be represented by structure XXXV as follows:

(XXXV)

wherein $R^8$ is an alkylene group such that the ring structure contains from 5 to 7 atoms. The $R^8$ group may be substituted with alkyl groups. An example of a suitable sultone compound is 1,3-propane sultone.

The battery electrolyte solution is conveniently prepared by dissolving or dispersing the lithium salt, the aromatic phosphorus compound and any other additives as may be used into the nonaqueous solvent. The order of mixing is in general not critical. The water content of the resulting battery electrolyte solution should be as low as possible. A water content of 50 ppm or less is desired and a more preferred water content is 30 ppm or less. The various components can be individually dried before forming the electrolyte solution, and/or the formulated electrolyte solution can be dried to remove residual water. The drying method selected should not degrade or decompose the various components of the electrolyte solution, nor promote undesired reactions between them. Thermal methods can be used, as can drying agents such as molecular sieves.

A battery containing the battery electrolyte solution of the invention can be of any useful construction. A typical battery construction includes an anode and cathode, with a separator and the electrolyte solution interposed between the anode and cathode so that ions can migrate through the electrolyte solution between the anode and the cathode. The assembly is generally packaged into a case. The shape of the battery is not limited. The battery may be a cylindrical type containing spirally-wound sheet electrodes and separators. The battery may be a cylindrical type having an inside-out structure that includes a combination of pellet electrodes and a separator. The battery may be a plate type containing electrodes and a separator that have been superimposed.

Suitable anode materials include, for example, carbonaceous materials such as natural or artificial graphite, carbonized pitch, carbon fibers, graphitized mesophase microspheres, furnace black, acetylene black and various other graphitized materials. The carbonaceous materials may be bound together using a binder such as a poly(vinylidene fluoride), polytetrafluoroethylene, a styrene-butadiene copolymer, an isoprene rubber, a poly(vinyl acetate), a poly(ethyl methacrylate), polyethylene or nitrocellulose. Suitable carbonaceous anodes and methods for constructing same are described, for example, in U.S. Pat. No. 7,169,511.

Other suitable anode materials include lithium metal, lithium alloys and other lithium compounds such as a lithium titanate anode.

Suitable cathode materials include inorganic compounds such as transition metal oxides, transition metal/lithium composite oxides, lithium/transition metal composite phosphates, transition metal sulfides, metal oxides, and transition metal silicates. Examples of transition metal oxides include MnO, $V_2O_5$, $V_6O_{13}$ and $TiO_2$. Transition metal/lithium composite oxides include lithium/cobalt composite oxides whose basic composition is approximately $LiCoO_2$, lithium/nickel composite oxides whose basic composition is approximately $LiNiO_2$, and lithium/manganese composite oxides whose basic composition is approximately $LiMn_2O_4$ or $LiMnO_2$. In each of these cases, part of the cobalt, nickel or manganese can be replaced with one or two metals such as Al, Ti, V, Cr, Fe, Co, Ni, Cu, Zn, Mg, Ga or Zr. Lithium/transition metal composite phosphates include lithium iron phosphate, lithium manganese phosphate, lithium cobalt phosphate, lithium iron manganese phosphate and the like. Examples of useful metal oxides include $SnO_2$ and $SiO_2$. Examples of useful metal silicates include lithium iron ortho silicate.

The electrodes are each generally in electrical contact with or formed onto a current collector. A suitable current collector for the anode is made of a metal or metal alloy such as copper, a copper alloy, nickel, a nickel alloy, stainless steel and the like. Suitable current collectors for the cathode include those made of aluminum, titanium, tantalum, alloys of two or more of these and the like.

The separator is interposed between the anode and cathode to prevent the anode and cathode from coming into contact with each other and short-circuiting. The separator is conveniently constructed from a nonconductive material. It should not be reactive with or soluble in the electrolyte solution or any of the components of the electrolyte solution under operating conditions. Polymeric separators are generally suitable. Examples of suitable polymers for forming the separator include polyethylene, polypropylene, polybutene-1, poly-3-methylpentene, ethylene-propylene copolymers, polytetrafluoroethylene, polystyrene, polymethylmethacrylate, polydimethylsiloxane, polyethersulfones and the like.

The electrolyte solution must be able to permeate through the separator. For this reason, the separator is generally porous, being in the form of a porous sheet, nonwoven or woven fabric or the like. The porosity of the separator is generally 20% or higher, up to as high as 90%. A preferred porosity is from 30 to 75%. The pores are generally no larger than 0.5 microns, and are preferably up to 0.05 microns in their longest dimension. The separator is typically at least one micron thick, and may be up to 50 microns thick. A preferred thickness is from 5 to 30 microns.

The battery is preferably a secondary (rechargeable) lithium battery. In such a battery, the discharge reaction includes a dissolution or delithiation of lithium ions from the anode into the electrolyte solution and concurrent incorporation of lithium ions into the cathode. The charging reaction, conversely, includes an incorporation of lithium ions into the anode from the electrolyte solution. Upon charging, lithium ions are reduced on the anode side, at the same time, lithium ions in the cathode material dissolve into the electrolyte solution.

The presence of the aromatic phosphorus compounds described herein improves battery safety and battery life by stabilizing the electrolyte solution against thermal degradation and runaway reactions, and/or otherwise reducing the ability of the electrolyte solution to catch on fire. Thermal degradation and runaway reactions can occur due to several circumstances, including (1) mechanical damage to the battery, which may cause short-circuiting within the battery structure; (2) thermal abuse of the battery, which is mainly due to storing and/or operating the battery under high temperature conditions; and (3) electrical conditions such as overcharging or the creation of electrical shorts.

Overcharge situations can cause lithium to form a dendritic structure. The dendritic structure can extend through the electrolyte solution and through the separator between the cathode and the anode, causing a short circuit. The short circuit can allow a very large current to flow through the electrolyte solution over a very short time period, releasing heat which can cause degradation of the electrolyte solution or even runaway reactions to occur. The runaway reactions can even cause the electrolyte solution to catch fire in the absence of a flame retardant or thermal runaway inhibitor. Even if the electrolyte solution does not catch on fire, the heat released by the runaway reactions can severely shorten the battery life.

Very surprisingly, it has been found that the presence of the aromatic phosphorus compound, rather than having an adverse affect, can in some cases improve battery capacity utilization, discharge rate capability and/or cycling stability.

Cycling stability can be evaluated by running the battery through a fixed number of charge/discharge cycles, at a given charge/discharge rate, and measuring the capacity of the battery at the start and at the end of the evaluation. Capacity tends to fall as the battery continues to be charged and discharged. For example, after 100 1C charge/discharge cycles, the capacity of the battery often drops to 60-70% of the starting capacity. However, when the battery electrolyte solution contains one or more phosphorus-sulfur compounds, carbonates that contain carbon-carbon unsaturation and/or sultone compounds, as described before, in addition to the aromatic phosphorus compound, the cycling stability tends to be significantly better, often approximating 80% or more capacity retention after 100 1C charge/discharge cycles.

The battery of the invention can be used in industrial applications such as electric vehicles, hybrid electric vehicles, plug-in hybrid electric vehicles, aerospace, e-bikes, etc. The battery of the invention is also useful for operating a large number of electrical and electronic devices, such as computers, cameras, video cameras, cell phones, PDAs, MP3 and other music players, televisions, toys, video game players, household appliances, power tools, medical devices such as pacemakers and defibrillators, among many others.

The following examples are provided to illustrate the invention, but are not intended to limit the scope thereof. All parts and percentages are by weight unless otherwise indicated.

The following aromatic phosphorus compounds are evaluated as additives in the following examples:

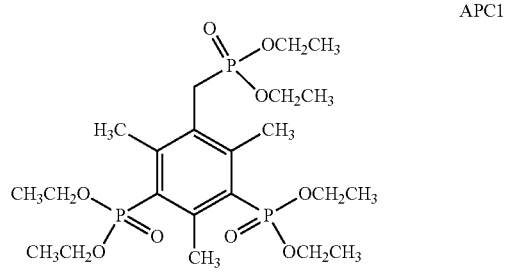

APC1

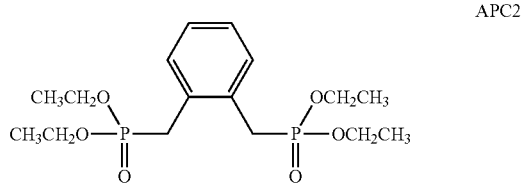

APC2

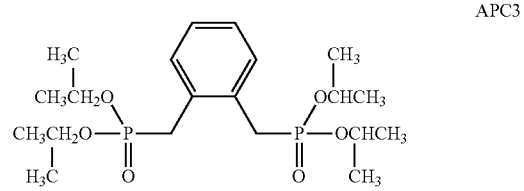

APC3

-continued

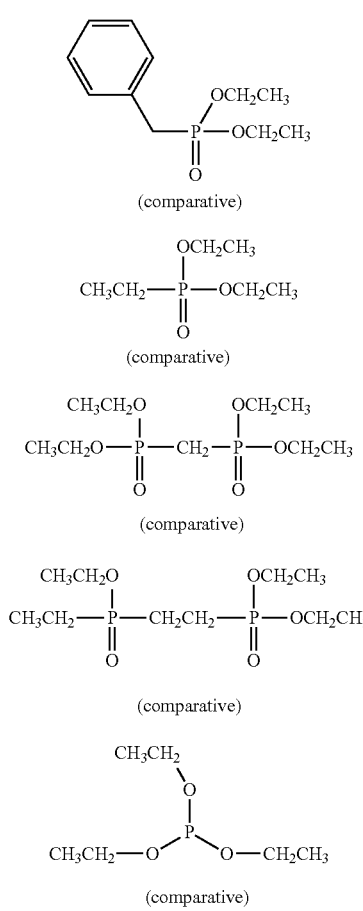

EXAMPLES 1-5 AND COMPARATIVE BATTERIES A-F

A control battery electrolyte solution consisting of a 1.0 M solution of $LiPF_6$ in a 50/50 by volume mixture of ethylene carbonate and diethyl carbonate is introduced into a 2025 button cell having a $LiCoO_2$ cathode, a Mesocarbon Microbead (MCMB) graphite anode and a polyolefin separator. The button cell is designated as Comparative Battery A. 4C discharge curves for Comparative Battery A are produced using a Maccor 4000 battery tester, using two C/10 cycles followed by five 4C cycles at ambient temperature. A representative discharge curve from that testing is indicated as curve "A" in each of FIGS. 1-4.

Battery Example 1 is made in the same manner, except that the electrolyte solution contains 5 weight percent of APC1. Battery Example 1 is tested in the same manner as is Comparative Battery A. A representative discharge curve from that testing is indicated as curve 1 in each of FIGS. 1-3.

Battery Example 2 is made and tested in the same manner as Battery Example 1, except that the electrolyte solution contains 5 weight percent of APC2 instead of APC1. A representative discharge curve is indicated as curve 2 in each of FIGS. 1-3.

Battery Example 3 is made and tested in the same manner as Battery Example 1, except that the electrolyte solution contains 5 weight percent of APC3 instead of APC1. A representative discharge curve is indicated as curve 3 in FIG. 2.

Comparative Batteries B-F are made and tested in the same manner as Battery Example 1, except that the electrolyte solution contains 5 weight percent of APC4, APC5, APC6, APC7 and APC8, respectively, instead of APC1. Representative discharge curves for each of these are indicated as curves B and C in FIG. 1, curves D and E in FIG. 2 and curve F in FIG. 3.

Figure 2:
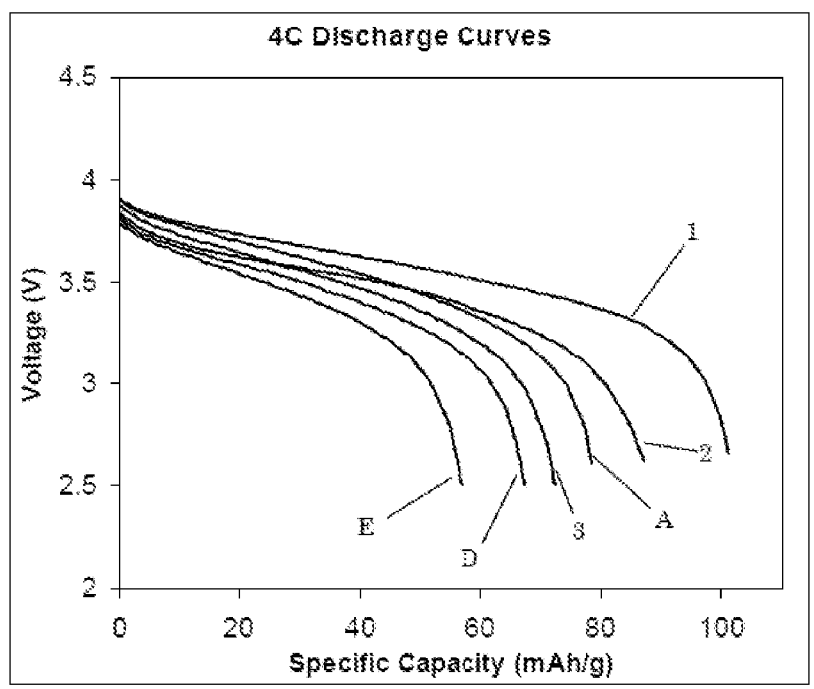
FIG. 2 is a graph of 4C discharge curves for three batteries in accordance with the invention and three comparative batteries.
Figure 3:
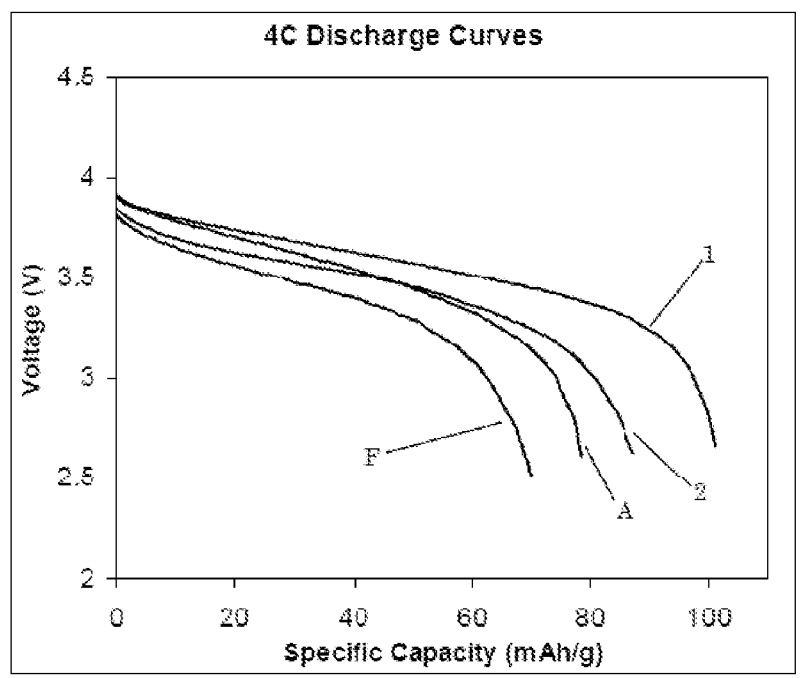
FIG. 3 is a graph of 4C discharge curves for two batteries in accordance with the invention and two comparative batteries.

The discharge curves in FIGS. 1-4 illustrate the change in voltage produced by the battery as the battery is drained with respect to the charge capacity delivered, as normalized by the total amount of electrode materials (in this case $LiCoO_2$ cathode) (so-called "specific capacity"). The desired performance is for the battery to deliver as much specific capacity as possible while the cell is drained within a specific voltage window, which in this case is from 2.5 to 4.2 volts. In FIGS. 1-3, curve A shows that the voltage produced by Comparative Battery A, which contains the control electrolyte solution without APC additive, drops to 2.5 volts after about 75-80 mAh/g specific capacity is delivered.

Battery Example 1 performs much better on this discharge test, despite the presence of 5 wt. % APC1. At the 4C discharge rate, more than 100 mAh/g specific capacity is delivered by the battery within the voltage window.

Battery Example 2 also performs better than the control on this discharge test, although not as well as Battery Example 2. Curve 2 in FIG. 1-3 shows that Battery Example 2 delivers 85-90 mAh/g specific capacity within the specified voltage window. As with Battery Example 1, the presence of the aromatic phosphorus compound improves battery performance on this discharge test relative to the control (Comparative Battery A).

Battery Example 3 performs only slightly worse on the discharge test than Comparative Sample A. Battery Example 3 delivers 72-75 mAh/g specific capacity within the voltage window.

Battery Example 3 outperforms each of Comparative Batteries B-F on this test. In the cases of Comparative Batteries B, C and E, the performance on the discharge test is far worse than that of Battery Example 3, whereas in the case of Comparative Battery F the performance is somewhat closer to, but still inferior to, that of Battery Example 3.

The various Examples and Comparative Samples illustrate how the presence of a phosphorus-based additive in a battery electrolyte solution can affect the electrical properties of a battery in unpredictable ways. Generally, the addition of a phosphorus-containing compound has a somewhat adverse effect, although the magnitude of that effect can vary considerably (comparing, e.g., the performance of Comparative Batteries B, C, and D with those of Comparative Batteries D and F and Battery Example 1). However, the presence of the aromatic phosphorus compound in accordance with the invention can have a beneficial effect, as in Battery Examples 1 and 2, or at most only a small detrimental effect on specific capacity (as in Battery Example 3). Moreover, small structural differences between the various phosphorus-containing compounds sometimes have very significant effects on the discharge curves, as can be seen by comparing the results for Battery Example 2 with those for Battery Example 3, and the results of Comparative Battery E with Comparative Battery F.

A duplicate of Battery Example 1 is prepared. 4C discharge curves are determined for the duplicate Battery Sample 1 as before, except this time using two C/10 cycles which are followed by five cycles each at C/2, 1C, 2C and 4C. A representative discharge curve from that testing is indicated as curve "1" in FIG. 4.

Battery Example 4 is identical to Battery Example 1, except only 1% by weight of APC1 is present. Battery Example 4 is tested in the same manner as the duplicate Battery Example 1. A representative discharge curve from that testing is indicated as curve "4" in FIG. 4.

Battery Example 5 is identical to Battery Example 1, except 10% by weight of APC1 is present. Battery Example 5 is tested in the same manner as the duplicate Battery Example 1 and Battery Example 4. A representative discharge curve from that testing is indicated as curve "5" in FIG. 4.

For comparison, a duplicate of Comparative Sample A (control without phosphorus-containing additive) is evaluated in the same manner. A representative discharge curve from that testing is indicated as curve "A" in FIG. 4.

Figure 4:
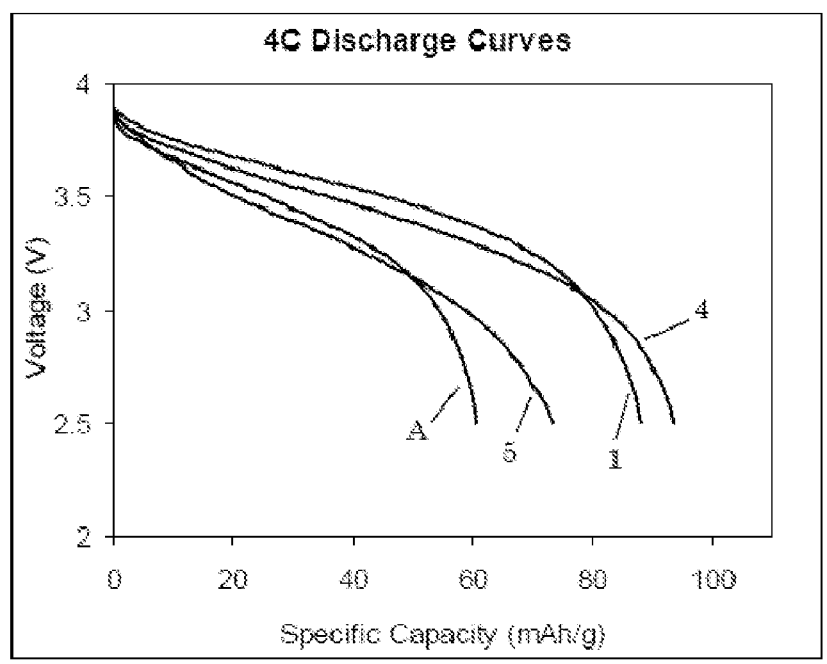
FIG. 4 is a graph of 4C discharge curves for three batteries in accordance with the invention and a comparative battery.

As seen in FIG. 4, each of Battery Examples 1, 4 and 5 performs much better on the discharge test than does Comparative Sample A, despite the presence of a phosphorus-containing additive.

The thermal stability of the electrolyte solutions of Comparative Sample A and Battery Example 1 are tested using differential scanning calorimetry (DSC) in the presence of charged $LiCoO_2$ cathode material. The electrolyte solution of Comparative Sample A produces a large exotherm beginning at about 220° C., indicating that a large amount of thermal decomposition begins at that temperature. The electrolyte solution of Battery Example 1 does not produce any exotherm until a temperature of about 250° C. is attained, and the amount of heat released is much smaller than that released by the control. The addition of APC1 at 5% loading therefore significantly increases the onset temperature of thermal decomposition as well as decreases the rate of heat release upon thermal decomposition.

EXAMPLES 6-9

A duplicate of Battery Example 1 is subjected to 100 1C charge/discharge cycles. The specific capacity of the battery is measured for each cycle. At the end of the 100 charge/discharge cycles, the specific capacity of Battery Example 1 has fallen to about 58% of the starting capacity.

Battery Example 6 is made and tested in the same manner as Battery Example 1, except that the battery electrolyte solution in this case also contains 0.2 weight percent of a phosphorus-sulfur compound of structure XXVI. After 100 1C charge/discharge cycles, this battery retains about 75% of its starting capacity. The addition of only a small amount of this phosphorus-sulfur compound is therefore seen to provide a significant benefit in capacity retention.

Battery Example 7 is made and tested in the same manner as Battery Example 1, except that the battery electrolyte solution in this case also contains 0.2 weight percent of a phosphorus-sulfur compound of structure XXXIV. After 100 1C charge/discharge cycles, this battery retains about 81% of its starting capacity. Again, the phosphorus-sulfur compound provides a significant benefit in capacity retention.

Battery Example 8 is made and tested in the same manner as Battery Example 1, except that the battery electrolyte solution in this case also contains 2.0 weight percent of vinylidene carbonate. After 100 1C charge/discharge cycles, this battery retains about 78% of its starting capacity.

Battery Example 9 is made and tested in the same manner as Battery Example 1, except that the battery electrolyte solution in this case also contains 2.0 weight percent of 1,3-propane sultone. After 100 1C charge/discharge cycles, this battery retains about 76% of its starting capacity.

Duplicate samples of Battery Examples 1 and 6 are cycled through 200 1C charge/discharge cycles. The thermal stability of each of the electrolyte solutions is then evaluated as described before. The electrolyte solution from Battery Example 1 exhibits an exotherm in the temperature range of about 235 to 260° C., whereas that of Battery Example 6 exhibits an exotherm at about 280° C. This data indicates that the presence of the phosphorus-sulfur compound in addition to the aromatic phosphate compound significantly increases the thermal stability of the electrolyte after cycling. These results are obtained even though no attempt was made to optimize the overall battery performance through selection of an optimized electrode structure or capacity balance.

EXAMPLES 10-12

A battery (Example 10) is constructed which is identical to that described with regard to Battery Example 1, except that the battery electrolyte solution contains 6% by weight APC1, and subjected to a formation cycle. The battery is then charged galvanostatically at a 1C rate to 4.2 V followed by a potentiostatic discharge at 4.2 V during which the current drops to below C/10. The battery is disassembled under an argon atmosphere in a manner not to cause a short circuit. The electrodes are washed with diethylcarbonate solvent to remove residual salts and electrolyte solution and dried under vacuum. About equal weights of the electrode and the recovered electrolyte solution are loaded, under argon, onto a DSC pan and sealed. The sample is subjected to DSC. Similar to Example 1, the material does not show an exotherm until at about 250° C., with the main exothermic peak appearing at about 290° C.

Battery Example 11 is made and tested identically as Example 10, except the battery electrolyte solution contains only 3% of APC1 and also contains 3% of a compound having the structure:

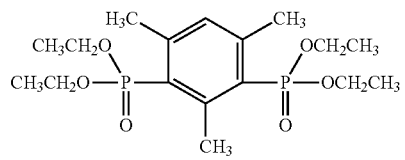

On DSC testing, this material exhibits a moderate exotherm at about 240° C. and a sharper exotherm at close to 300° C.

Battery Example 12 is made and tested identically as Example 10, except the battery electrolyte solution contains only 3% of APC1 and also contains 3% of a compound having the structure:

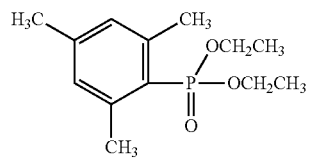

On DSC testing, this material exhibits a moderate exotherm at about 240° C. and a sharper exotherm at close to 300° C., very similar to that of Example 11.

Examples 10-12 all perform very similarly on rate capability performance testing.

Fresh battery electrolyte solutions for Examples 10-12 are stored for 9 weeks at room temperature in sealed bottle. The Example 10 solution turns very cloudy during storage, but those of Examples 11 and 12 remain clear. The presence of the mixture of aromatic phosphorus compounds is seen to improve the storage stability of the electrolyte solutions.

What is claimed is:

1. A battery electrolyte solution comprising at least one lithium salt and a non-aqueous solvent in which the lithium salt is soluble, wherein from 0.01 to 80% by weight of the battery electrolyte solution is at least one aromatic phosphorus compound represented by the structure:

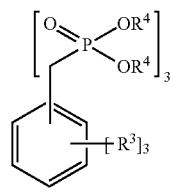

wherein $R^3$ is independently hydrogen, $C_{1-3}$ alkyl, hydroxyl, halogen, alkoxyl containing from 1 to 3 carbon atoms or $C_{2-3}$ alkylene and each $R^4$ is independently alkyl having from 1 to 8 carbon atoms.

2. The battery electrolyte solution of claim 1 wherein each $R^4$ is independently methyl, ethyl or isopropyl and each $R^3$ is independently hydrogen or $C_{1-3}$ alkyl.

3. The battery electrolyte solution of claim 1 wherein the aromatic phosphorus compound has the structure:

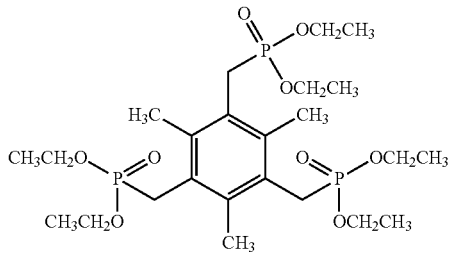

4. The battery electrolyte solution of claim 1 wherein the solvent includes at least one material selected from linear alkyl carbonates, cyclic carbonates, cyclic esters, linear esters, alkyl ethers, nitriles, sulfones, sulfolanes, siloxanes and sultones.

5. The battery electrolyte solution of claim 4 wherein the solvent includes at least one linear alkyl carbonate, at least one cyclic carbonate, or a mixture thereof.

6. The battery electrolyte solution of claim 1 wherein the lithium salt is at least one of $LiPF_6$, $LiClO_4$, $LiBF_4$, $LiAsF_6$, $LiCF_3SO_3$ and $LiN(SO_2CF_3)_2$.

7. The battery electrolyte solution of claim 1 which further comprises at least one other additive selected from a solid electrolyte interface formation promoter, a cathode protection agent, a lithium salt stabilizer, a lithium deposition improving agent, an ionic solvation enhancer, a corrosion inhibitor, a wetting agent and a viscosity reducing agent.

8. The battery electrolyte solution of claim 1 which further comprises at least one phosphorus-sulfur compound represented by the structure:

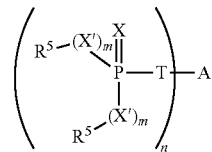

wherein X is oxygen or sulfur, T is a covalent bond, oxygen or sulfur, provided that at least one of X and T is sulfur, each X' is independently oxygen or sulfur, each m is independently zero or 1 when X' is oxygen and zero, 1 or 2 when X' is sulfur, n is at least 1 and preferably at least 2, each $R^5$ is independently an unsubstituted or inertly substituted hydrocarbyl group or the $R^5$ groups together form an unsubstituted or inertly substituted divalent organic group and A is an organic linking group.

9. The battery electrolyte solution of claim 1 which further comprises at least one carbonate compound having aliphatic carbon-carbon unsaturation.

10. The battery electrolyte solution of claim 1 which further comprises at least one sultone compound.

11. An electrical battery comprising an anode, a cathode, a separator disposed between the anode and cathode, and an electrolyte solution in contact with the anode and cathode, wherein the electrolyte solution is a battery electrolyte solution of claim 1.

* * * * *